US 9,256,328 B2

(12) United States Patent
Kwon et al.

(10) Patent No.: US 9,256,328 B2
(45) Date of Patent: Feb. 9, 2016

(54) TOUCH INPUT SENSING DEVICE AND TOUCH INPUT SENSING METHOD

(75) Inventors: Yong Il Kwon, Gyunggi-do (KR); Sang Ho Lee, Gyunggi-do (KR); Gyung Hee Hong, Seoul (KR); Tah Joon Park, Gyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 179 days.

(21) Appl. No.: 13/332,603

(22) Filed: Dec. 21, 2011

(65) Prior Publication Data

US 2013/0063390 A1 Mar. 14, 2013

(30) Foreign Application Priority Data

Sep. 9, 2011 (KR) .................. 10-2011-0091961

(51) Int. Cl.
*G06F 3/045* (2006.01)
*G06F 3/044* (2006.01)
*G06F 3/041* (2006.01)

(52) U.S. Cl.
CPC .............. *G06F 3/044* (2013.01); *G06F 3/0418* (2013.01)

(58) Field of Classification Search
CPC ....... G06F 3/044; G06F 3/0418; G06F 3/042; G06F 3/045; G06F 2203/04107; G06F 2203/04111; G06F 2203/04112; G06F 2203/04113
USPC ........................................................ 345/174
See application file for complete search history.

(56) References Cited

U.S. PATENT DOCUMENTS

| | | | |
|---|---|---|---|
| 5,495,077 A | 2/1996 | Miller et al. | |
| 6,452,514 B1 | 9/2002 | Philipp | |
| 8,416,207 B2 * | 4/2013 | Kasajima | 345/173 |
| 8,432,374 B2 * | 4/2013 | Yang et al. | 345/174 |
| 8,674,950 B2 * | 3/2014 | Olson | 345/173 |
| 2004/0178995 A1 * | 9/2004 | Sterling | 345/173 |
| 2007/0132737 A1 * | 6/2007 | Mulligan et al. | 345/173 |
| 2010/0097355 A1 * | 4/2010 | Jang et al. | 345/178 |

(Continued)

FOREIGN PATENT DOCUMENTS

| | | |
|---|---|---|
| KR | 10-2010-0044063 | 4/2010 |
| KR | 10-2010-0067178 | 6/2010 |

OTHER PUBLICATIONS

Korean Office Action issued May 16, 2013 in corresponding Korean Patent Application No. 10-2011-0091961.

(Continued)

*Primary Examiner* — Aneeta Yodichkas
*Assistant Examiner* — Joseph Fox
(74) *Attorney, Agent, or Firm* — NSIP Law

(57) ABSTRACT

There are a touch input sensing device and a touch input sensing method. The touch input sensing device includes: a plurality of sensing electrodes; and a controller obtaining sensing signals generated from the plurality of sensing electrodes through a plurality of sensing channels electrically connected to the plurality of sensing electrodes, wherein the controller calculates a difference value between the sensing signals obtained from the plurality of sensing channels connected to the mutually adjacent sensing electrodes among the plurality of sensing electrodes to determine a touch input. A weighting value is assigned to a difference value between sensing signals obtained from mutually adjacent sensing electrodes, based on which the coordinates, or the like, of a touch input are determined, thus significantly reducing the influence of noise and accurately determining a touch input.

11 Claims, 6 Drawing Sheets

(56) References Cited

U.S. PATENT DOCUMENTS

| | | |
|---|---|---|
| 2010/0307840 A1 | 12/2010 | Kobayashi et al. |
| 2010/0328255 A1* | 12/2010 | Ishizaki et al. ............... 345/174 |
| 2011/0025638 A1* | 2/2011 | Salaverry et al. ............ 345/174 |
| 2011/0227865 A1* | 9/2011 | Baek ............................ 345/174 |
| 2012/0169649 A1* | 7/2012 | Chang .......................... 345/174 |

OTHER PUBLICATIONS

German Office Action issued Jul. 31, 2012 in corresponding German Patent Application No. 102011121107.5.

German Office ActiOn dated Oct. 6, 2014 in corresponding German Patent Application No. 102011121107.5.

* cited by examiner

TOUCH INPUT SENSING DEVICE AND TOUCH INPUT SENSING METHOD

CROSS-REFERENCE TO RELATED APPLICATIONS

This application claims the priority of Korean Patent Application No. 10-2011-0091961 filed on Sep. 9, 2011, in the Korean Intellectual Property Office, the disclosure of which is incorporated herein by reference.

BACKGROUND OF THE INVENTION

1. Field of the Invention

The present invention relates to a device and method of sensing a touch input and, more particularly, to a touch input sensing device and a touch input sensing method capable of accurately determining a touch input by significantly reducing the influence of noise.

2. Description of the Related Art

A touch input sensing device such as a touch screen, a touch pad, or the like, an input device attached to a display device to provide an intuitional user interface to users, is commonly employed in various electronic devices such as mobile phones, personal digital assistants (PDAs), navigation devices, or the like. In particular, recently, as consumer demand for smart phones has increased, the rate of the employment of touch screens as touch input sensing mechanisms, providing various input methods in a limited form factor, is gradually on the rise.

Touch screens employed in mobile devices may be divided into resistive touch screens and capacitive touch screens, according to how a touch input is sensed, and of these, capacitive touch screens, having a relatively long life span and easy implementation of various input methods and gestures, are increasingly employed. In particular, in comparison to resistive touch screens, capacitive touch screens can easily implement a multi-touch interface, and thus, they are extensively applied to devices such as smart phones, or the like.

However, in terms of the characteristics of a touch screen integrally provided in a display device, the touch screen is inevitably affected by noise generated by the display device. In order to significantly reduce the influence of this noise, on the touch input-sensing mechanism such as a touch screen, a specific shielding layer may be provided between sensing electrodes of the touch input sensing device and the display device. In this case, however, overall transmittance may be degraded and overall product thickness may be increased. Also, the presence of the shielding layer may block noise transferred from the display device, but it may be difficult to block any other noise from a different source, such as power noise, radio frequency (RF) noise, or the like.

SUMMARY OF THE INVENTION

An aspect of the present invention provides a touch input sensing device and a touch input sensing method capable of accurately determining a touch input by significantly reducing the influence of various noise components without using a shield layer.

According to an aspect of the present invention, there is provided a touch input sensing device including: a plurality of sensing electrodes; and a controller obtaining sensing signals generated from the plurality of sensing electrodes through a plurality of sensing channels electrically connected to the plurality of sensing electrodes, wherein the controller calculates a difference value between the sensing signals obtained from the plurality of sensing channels connected to mutually adjacent sensing electrodes among the plurality of sensing electrodes to determine a touch input.

The controller may include: a first circuit unit obtaining the sensing signals and a second circuit unit determining the touch input.

At least one of the first and second circuit units may include an arithmetic operation circuit calculating the difference value between the sensing signals obtained from the plurality of sensing channels connected to the mutually adjacent sensing electrodes.

The controller may include a driving circuit unit applying a driving signal to at least some of the plurality of sensing electrodes.

The controller may obtain a change in capacitance generated between the sensing electrode to which the driving signal is applied and a sensing electrode adjacent to the sensing electrode to which the driving signal is applied, as the sensing signal.

The controller may determine the touch input by assigning a weighting value, according to the plurality of sensing channels, to the difference value between the sensing signals.

The controller may determine the weighting value based on the sensing channel having a smallest difference value between the sensing signals.

According to another aspect of the present invention, there is provided a touch input sensing method including: obtaining sensing signals generated from a plurality of sensing electrodes; calculating a difference value between the sensing signals obtained from mutually adjacent sensing electrodes among the plurality of sensing electrodes; and determining a touch input based on the difference value between the sensing signals.

In the obtaining of the sensing signals, a change in capacitance generated by the plurality of sensing electrodes due to the touch input may be obtained as the sensing signal.

The method may further include: applying a driving signal to at least some of the plurality of sensing electrodes.

In the obtaining of the sensing signals, a change in capacitance generated between the sensing electrode to which the driving signal is applied and a sensing electrode adjacent to the sensing electrode to which the driving signal is applied, may be obtained as the sensing signal.

In the determining of the touch input, a weighting value may be assigned to each of the difference values between the sensing signals to thus determine the touch input.

In the determining of the touch input, a weighting value with respect to each of the difference values between the sensing signals may be determined based on a smallest difference value between the sensing signals.

In the determining of the touch input, a relatively large weighting value may be assigned to a difference value between the sensing signals calculated from the sensing electrode close to the sensing electrode having the smallest difference value between the sensing signals.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
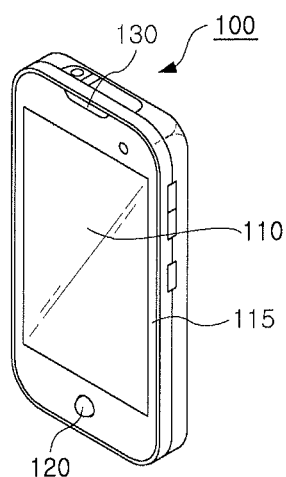
FIG. 1 is a perspective view of an electronic device to which a touch input sensing device according to an embodiment of the present invention may be applicable.

Embodiments of the present invention will be described in detail with reference to the accompanying drawings. These embodiments will be described in detail for those skilled in the art in order to practice the present invention. It should be appreciated that various embodiments of the present invention are different but do not have to be exclusive. For example, specific shapes, configurations, and characteristics described in an embodiment of the present invention may be implemented in another embodiment without departing from the spirit and the scope of the present invention. In addition, it should be understood that position and arrangement of individual components in each disclosed embodiment may be changed without departing from the spirit and the scope of the present invention. Therefore, a detailed description described below should not be construed as being restrictive. In addition, the scope of the present invention is defined only by the accompanying claims and their equivalents when appropriate. The similar reference numerals will be used to describe the same or similar functions throughout the accompanying drawing.

Hereinafter, embodiments of the present invention will be described in detail with reference to the accompanying drawings so that those skilled in the art may easily practice the present invention.

FIG. 1 is a perspective view of an electronic device to which a touch input sensing device according to an embodiment of the present invention may be applicable. With reference to FIG. 1, an electronic device 100 according to the present embodiment may include a display device 110 outputting a screen image, an input unit 120, an audio unit 130 for outputting a voice, and the like. The electronic device 100 may also include a touch input sensing device integrally formed with the display device 110.

As shown in FIG. 1, in the case of a mobile device or the like, a touch input sensing device is generally integrated with a display device 110, and the touch input sensing device should have such high light transmittance as to allow light to be transmitted through a screen image displayed on the display device 110. Thus, the touch input sensing device may be implemented by forming sensing electrodes with a material such as indium tin oxide (ITO), indium zinc oxide (IZO), ZnO (Zinc Oxide) carbon nano-tube (CNT), or graphene, which is transparent and has electric conductivity, on a base substrate formed of a transparent film material such as polyethylene terephthalate (PET), polycarbonate (PC), polyethersulfone (PES), polyimide (PI), or the like. Wiring patterns connected with the sensing electrodes formed of a transparent conductive material may be disposed at a bezel region 115 of the display device 110, and here, since the wiring patterns are visually shielded by the bezel region 115, the wiring patterns may be formed of a metal material such as silver (Ag), copper (Cu), or the like.

Of course, when the touch input sensing device according to an embodiment of the present invention is not integrally provided with the display device 110 such as a touch pad, or the like, of a notebook computer, sensing electrodes may be simply patterned using metal on a circuit board and fabricated. Here, for the sake of brevity, a touch input sensing device and a touch input sensing method according to an embodiment of the present invention will be described based on a touch screen.

Figure 2:
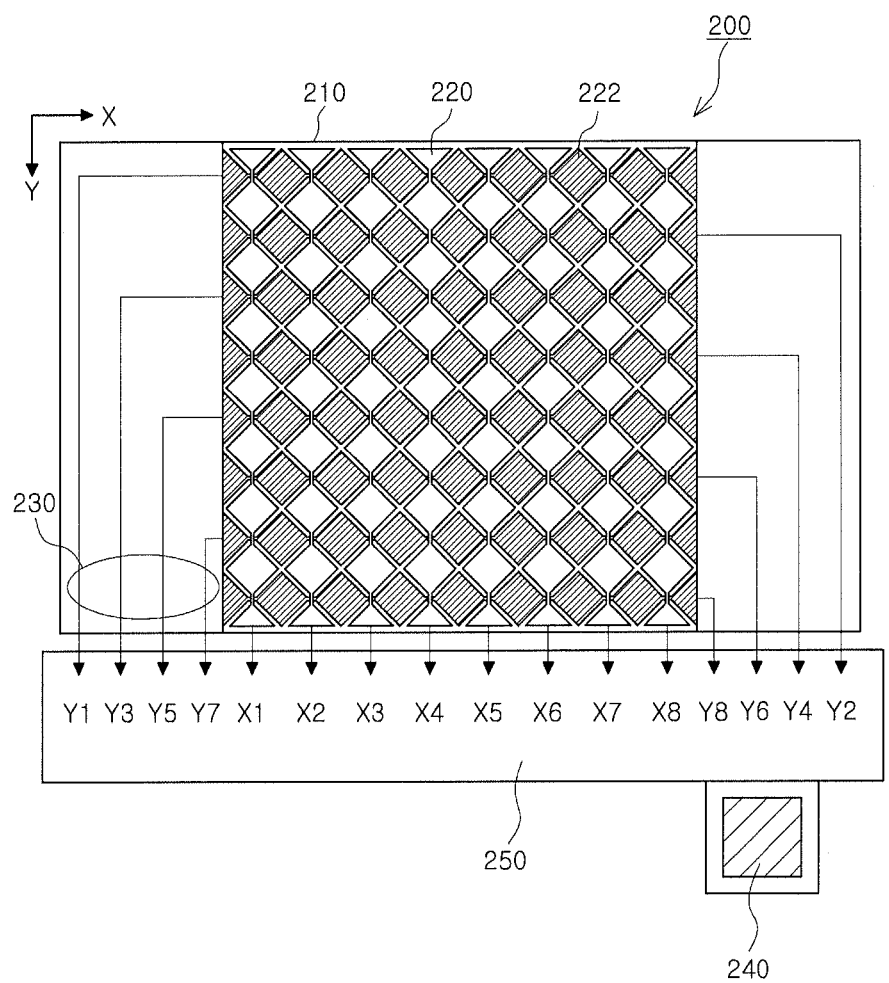
FIG. 2 is a view showing the structure of the touch input sensing device according to an embodiment of the present invention.

FIG. 2 is a view showing the structure of the touch input sensing device according to an embodiment of the present invention. With reference to FIG. 2, a touch input sensing device 200 according to the present embodiment may include a base substrate 210 formed of a transparent material, sensing electrodes 220 formed on the base substrate 210, wiring patterns 230 connected to the sensing electrodes 220, and a controller 240 electrically connected to the sensing electrodes 220 through the wiring patterns 230. As shown in FIG. 2, a circuit board 250 with the controller 240 mounted thereon may be attached to a lower end of the base substrate 210 through anisotropic conductive film (ACF) bonding, or the like, and a bonding pad formed by elongating the wiring patterns 230 may be provided at a lower end of the base substrate 210 to allow each sensing channel terminal of the controller 240 to be electrically connected to the sensing electrodes 220 through the wiring patterns 230.

As described above, the sensing electrodes 220 may be formed of a transparent conductive material such as ITO, ZnO, IZO, CNT, or the like, and may have a certain pattern to allow the controller 240 to determine a touch input based on a sensing signal generated in the sensing electrodes 220. The sensing electrodes 220 illustrated in FIG. 2 may have a lozenge pattern or a diamond pattern, and lozenge shaped or diamond-like unit electrodes 222 may be connected to each other in a horizontal or vertical direction to form the single sensing electrodes 220. Hereinafter, for the sake of brevity, the sensing electrodes 220 extending in the horizontal direction will be referred to as first electrodes, and the sensing electrodes 220 extending in the vertical direction will be referred to as second electrodes.

The first and second electrodes have such a shape that lozenge shaped or diamond-like unit electrodes 222 extend in the horizontal or vertical direction, and the first and second electrodes may be disposed on different layers or on the same layer. Spaces between the first electrodes may be filled with second electrodes, and when the first and second electrodes are all disposed on the same layer, a bridge structure in which a certain insulating material is disposed at crossings of the first and second electrodes may be employed in order to electrically separate the first and second electrodes at the crossings.

As shown in FIG. 2, the first and second electrodes are connected to separate wiring patterns. Namely, as shown in FIG. 2, when eight first electrodes and eight second electrodes are included in the touch input sensing device 200, a total of 16 wiring patterns 230 are provided along the bezel region of the base substrate 210, and the controller 240 may include at least 16 sensing channels in order to be connected with the respective wiring patterns 230.

The controller 240 may be electrically connected to the sensing electrodes 220 through the sensing channels and the respective wiring patterns 230, and may include a sensing circuit for obtaining sensing signals generated by the sensing electrodes 220. The sensing signals may be electrical signals generated according to a change in self-capacitance generated between a contact object and each of the first and second electrodes or electrical signals generated according to a change in mutual capacitance generated between the first and second electrodes by a contact object. In particular, the controller 240 may include a driving circuit for applying a driving signal to at least one of the first and second electrodes when a change in the mutual capacitance is sensed.

For example, the controller 240 may measure a change in the capacitance generated by the sensing electrodes 220, in the form of a voltage. The change in the capacitance measured by a voltage magnitude may be converted into a digital signal by an analog-to-digital converter (ADC) or a time-to-digital converter (TDC), and the controller 240 may determine the coordinates of a touch input, a multi-touch, a gesture, or the like, by using the converted digital signal.

Also, the controller 240 may include a subtraction circuit for calculating a difference between sensing signals obtained from sensing channels connected to adjacent sensing electrodes 220. The difference between the sensing signals calculated by the subtraction circuit may be used to determine a touch input by a main controller of the controller 240. The subtraction circuit calculating the difference between the sensing signals obtained from the adjacent sensing electrodes 220 may be included in at least one of an analog circuit and a digital circuit of the controller 240.

Figure 3:
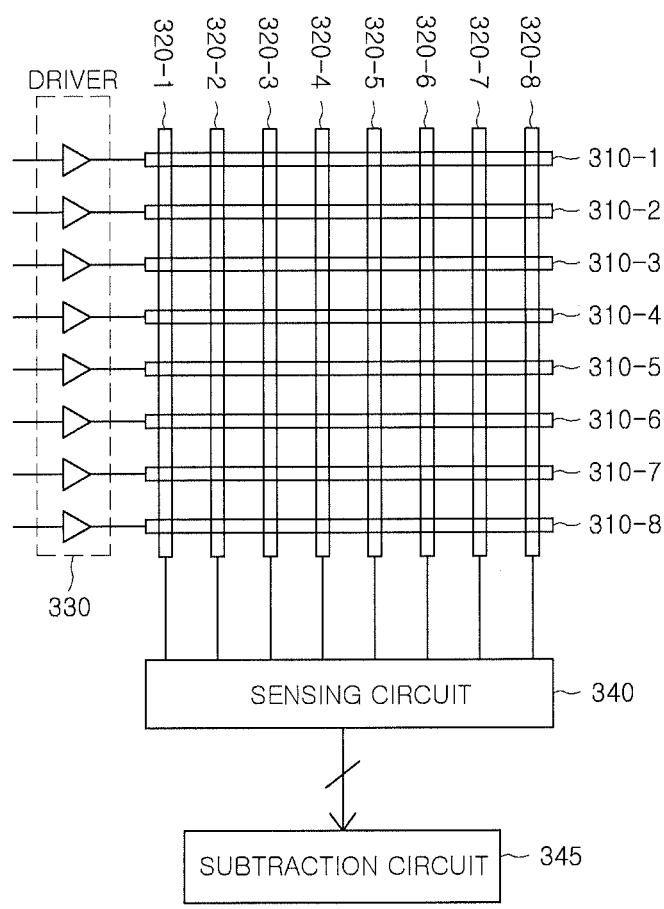
FIGS. 3 and 4 are views explaining a method of determining a touch input of the touch input sensing device according to an embodiment of the present invention.
Figure 4:
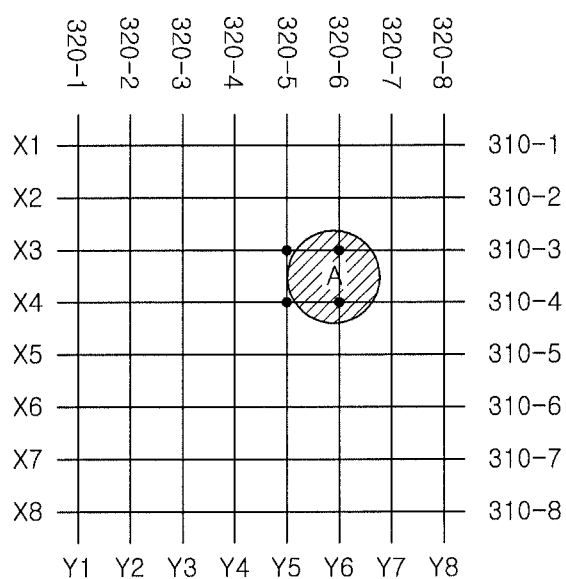

FIGS. 3 and 4 are views explaining a method of determining a touch input of the touch input sensing device according to an embodiment of the present invention. With reference to FIG. 3, a driving circuit 330 of a controller may be connected to first electrodes 310-1 to 310-8 extending in a horizontal direction, and a sensing circuit 340 of the controller may be connected to second electrodes 320-1 to 320-8 extending in a vertical direction. Namely, in FIGS. 3 and 4, the touch input sensing devices are assumed to be touch input sensing devices for sensing mutual capacitance, but, of course, they may also be implemented as touch input sensing devices sensing self-capacitance according to a different embodiment of the present invention as described above.

The sensing circuit 340 may include a charge pump circuit for measuring capacitance and an ADC for converting a capacitance value measured as an analog value (which is generally measured by the magnitude of a voltage) into a digital signal form. Also, according to the present embodiment, the sensing circuit 340 may further include a subtraction circuit 345 calculating the difference between sensing signals obtained by sensing channels connected to adjacent sensing electrodes 220 besides the charge pump circuit and the ADC. In FIG. 3, it is assumed that the subtraction unit 345 calculates the difference between the sensing signals which have been converted into the digital signals, but as mentioned above, the difference between the sensing signals may be calculated with the signals in the analog form prior to the conversion into a digital signal using the ADC.

Mutual capacitance according to a driving signal applied to the first electrodes 310-1 to 310-8 may be generated at the crossings of the first electrodes 310-1 to 310-8 and the second electrodes 320-1 to 320-8 disposed to cross each other. When the mutual capacitance is generated, when a touch input is generated at a particular position, a relatively large change in capacitance is formed at a crossing close to the position where the touch input is generated. On the assumption that a touch input is generated at a potion A in FIG. 4, when a driving signal is applied to the third and fourth first electrodes 310-3 and 310-4, relatively high sensing signals may be obtained from the fifth and sixth second electrodes 320-5 and 320-6. When the sensing signals are obtained, the controller 350 may calculate a difference value between the sensing signals obtained through sensing channels connected to the mutually adjacent sensing electrodes 320-1 to 320-8 by using the subtraction circuit 345. This will be described with reference to FIG. 4.

With reference to FIG. 4, when a touch input is generated at the position A, relatively high sensing signals are generated from four crossings of (3, 5), (4, 5), (3, 6), (4, 6) among a total of 64 crossings disposed in a matrix form. In FIGS. 3 and 4, it is assumed that the driving signal is applied to the first electrodes 310-1 to 310-8 extending in the horizontal direction and sensing signals are obtained from the second electrodes 320-1 to 320-8 extending in the vertical direction, so the difference between the sensing signals obtained from the mutually adjacent second electrodes 320-1 to 320-8 may be calculated. Namely, the difference between the sensing signals obtained from the sensing channels Y1 and Y2, the difference between the sensing signals obtained from the sensing channels Y2 and Y3, and the like, are sequentially calculated, and a total of seven calculations up to the difference between the sensing signals obtained from the sensing channels Y7 and Y8 are repeatedly performed, thus calculating seven difference value data of the sensing signals.

When a touch input is generated from the position A as mentioned above, high sensing signals are generated from the crossings (3, 5), (4, 5), (3, 6), (4, 6) at which the first electrodes 310-3 and 310-4 and the second electrodes 320-5 and 320-6 cross, and merely very weak sensing signals may be sensed from the other remaining 60 crossings. Data obtained when the driving signal is applied to the third first electrode 310-3 and data obtained when the driving signal is applied to the fourth first electrode 310-4 are assumed as shown in FIG. 4, and when the difference value data between the sensing signals of the adjacent second electrodes 320-1 to 320-8 are calculated, the results are shown in Table 1 and Table 2 below.

TABLE 1

Sensing signal data when driving signal is applied to the third first electrode 310-3

| INDEX | 320-1 | 320-2 | 320-3 | 320-4 | 320-5 | 320-6 | 320-7 | 320-8 |
|---|---|---|---|---|---|---|---|---|
| Sensing signal | 0 | 0 | 0 | 2 | 8 | 10 | 2 | 0 |

TABLE 2

Sensing signal data when driving signal is applied to the fourth first electrode 310-4

| INDEX | 320-1 | 320-2 | 320-3 | 320-4 | 320-5 | 320-6 | 320-7 | 320-8 |
|---|---|---|---|---|---|---|---|---|
| Sensing signal | 0 | 0 | 0 | 1 | 4 | 7 | 2 | 0 |

When it is assumed that when a driving signal is applied to the other first electrodes 310-1, 310-2, and 310-5 to 310-8 except to the third and fourth first electrodes 310-3 and 310-4, sensing signals of a certain numerical value or greater are not obtained from all of the second electrodes 320-1 to 320-8, the overall data may be obtained from the obtained sensing signal data as shown in Table 1 and Table 2. Table 3 below shows the sum of the sensing signal data obtained by index.

TABLE 3

Sensing signal data

| INDEX | 320-1 | 320-2 | 320-3 | 320-4 | 320-5 | 320-6 | 320-7 | 320-8 |
|---|---|---|---|---|---|---|---|---|
| Sensing signal | 0 | 0 | 0 | 3 | 12 | 17 | 4 | 0 |

Thus, the sensing signal difference value data may be obtained as shown in Table 4 below

TABLE 4

| INDEX | 1 | 2 | 3 | 4 | 5 | 6 | 7 |
|---|---|---|---|---|---|---|---|
| Sensing signal difference value data | 0 | 0 | +3 | +9 | +5 | −13 | −4 |

In Table 4, Index value N refers to sensing signal difference value data between Nth second electrode and (N+1)th second electrode. A method of calculating coordinates of a touch input from the data obtained as shown in Table 4 will be described with reference to the graph of FIG. 5.

Figure 5:
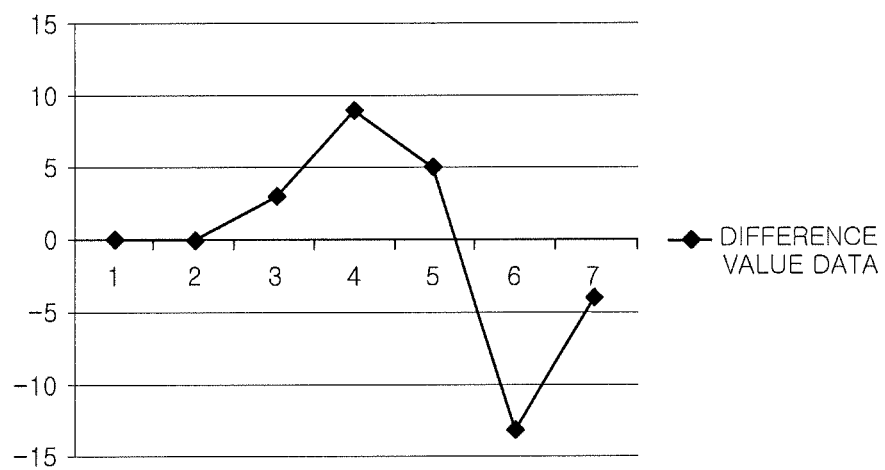
FIG. 5 is a graph for explaining a touch input sensing method according to an embodiment of the present invention.

FIG. 5 is a graph for explaining a touch input sensing method according to an embodiment of the present invention. With reference to FIG. 5, indexes 1 to 7 may be respectively assigned to the sensing signal difference value data between the mutually adjacent second electrodes 320-1 to 320-8, and it is assumed to be an X axis. Similar to Table 4, a Y axis value corresponding to each index value N of the X axis refers to sensing signal difference value data between Nth second electrode and (N+1)th second electrode.

FIG. 5 is a graph corresponding to Table 4, and X-axis directional coordinates of a touch input may be only calculated from Table 4 and FIG. 5. A method of calculating Y-axis directional coordinates of a touch input will be described below.

With reference to FIG. 5, the sign of the sensing signal difference value data is changed between index 5 and index 6 in the X axis. Thus, a reference value for determining coordinates of a touch input is index 6 which comes the first after the sign is changed. When values appearing on the graph of FIG. 5 are substituted according to Equation 1 below, based on 6, the X-axis direction coordinates of the touch input may be calculated.

$$X \text{ axis coordinate} = \text{reference value} + \frac{\Sigma[D(i) * \text{Weighting Value}]}{\sum_{i=1}^{7}[i * D(i)]} \quad \text{[Equation 1]}$$

In Equation 1, D(i) is a Y axis value when the X axis value in the graph of FIG. 5 is i, namely, sensing signal difference value data, and a weighting value is set to be different according to D(i). Equation 2 shows the results obtained by substituting the values in the graph of FIG. 5 and the values of Table 4 to Equation 1.

[Equation 2]

$$X \text{ axis coordinate} = 6 + \frac{\Sigma[3*3 + 9*2 + 5*1 - 13*1 - 4*2]}{\sum_{i=1}^{7}[3*3 + 4*9 + 5*5 + 6*(-13) + 7*(-4)]}$$

$$= 6 + \frac{11}{-36} = 5.69$$

As shown in Equation 2, X axis coordinates of the touch input is obtained to be 5.69. With reference to Table 3, a highest sensing signal may be obtained from the fifth second electrode 320-5 and the sixth second electrode 320-6, and in this case, since the sensing signal obtained from the sixth second electrode 320-6 is greater than the sensing signal obtained from the fifth second electrode 320-5, it may be estimated that the touch input has been applied to a position between the fifth and sixth second electrodes in the X axis direction, specifically, a position closer to the sixth second electrode 320-6. Thus, it is noted that the X axis coordinates 5.69 obtained by Equation 2 is an accurate value in comparison to the actual touch input coordinates.

Y axis coordinates of the touch input may also be calculated according to a process similar to those of Equation 1 and Equation 2. Here, in order to calculate the Y axis coordinates, sensing signals obtained from the respective first electrodes 310-1 to 310-8 are required, so when a driving signal is applied to the respective first electrodes 310-1 to 310-8, sensing signal difference values may be configured to be calculated by a value obtained by adding all of the sensing signals obtained from the second electrodes 320-1 to 320-8. With reference to Table 1 and Table 2, sensing signals and sensing signal difference value data for calculating Y axis coordinates are given as shown in Table 5 and Table 6 below.

TABLE 5

| INDEX | 310-1 | 310-2 | 310-3 | 310-4 | 310-5 | 310-6 | 310-7 | 310-8 |
|---|---|---|---|---|---|---|---|---|
| Sensing signal | 0 | 0 | 22 | 14 | 0 | 0 | 0 | 0 |

TABLE 6

| INDEX | 1 | 2 | 3 | 4 | 5 | 6 | 7 |
|---|---|---|---|---|---|---|---|
| Sensing signal difference value data | 0 | +22 | −8 | −14 | 0 | 0 | 0 |

As a result, a reference value for calculating the Y axis coordinates is 3, and when the values of Table 6 are substituted to Equation 1, Y axis coordinates may be obtained to be 3.39. As shown in Table 5, it is noted that the touch input is positioned between the third and fourth first electrodes and it is biased to the third first electrode 310-3. Thus, it is confirmed that the Y axis coordinate value 3.39 calculated according to the present embodiment is very approximate to the actual touch input position.

Figure 6:
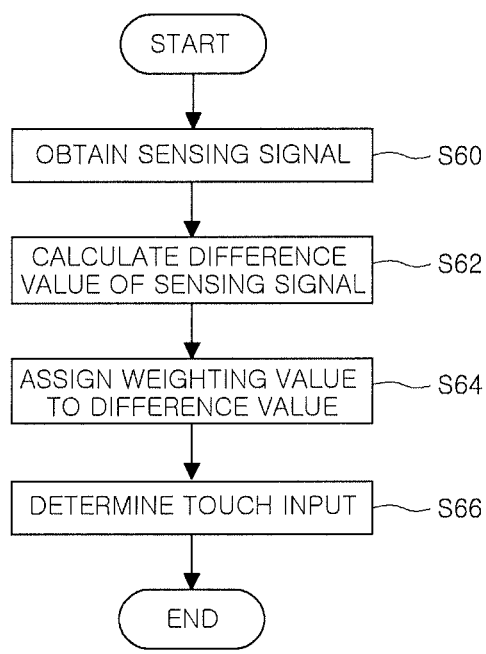
FIG. 6 is a flow chart illustrating a process of the touch input sensing method according to an embodiment of the present invention.

FIG. 6 is a flow chart illustrating a process of the touch input sensing method according to an embodiment of the present invention. With reference to FIG. 6, a touch input sensing method according to the present embodiment may start with obtaining a sensing signal by the controller 350 (S60). As described above, the sensing signal may correspond to a change in capacitance generated by the first electrodes 310-1 to 310-8 and the second electrodes 320-1 to 320-8, and the controller 350 may include a sensing circuit for sensing the change in capacitance. When the sensing signal is obtained, the controller 350 may calculate a difference value between sensing signals obtained from the mutually adjacent first electrodes 310-1 to 310-8 or the mutually adjacent second electrodes 320-1 to 320-8 (S62).

When the touch input sensing method according to the present embodiment is applied to the touch input sensing device based on the mutual capacitance sensing scheme in which a driving signal is applied to at least some of the first electrodes 310-1 to 310-8, the difference value between the sensing signals calculated in operation S62 may be separately calculated for each of the first electrodes 310-1 to 310-8 and the second electrodes 320-1 to 320-8. Namely, the driving signal may be sequentially applied to the first electrodes 310-1 to 310-8 and the second electrodes 320-1 to 320-8 may be sensed to obtain sensing signals. And then, the sensing signals obtained from the second electrodes 320-1 to 320-8 when the driving signal was applied to the respective first electrodes 310-1 to 310-8 may be added to be used for calculating the X axis coordinates, and the sensing signals obtained from the respective second electrodes 320-1 to 320-8 after one period of applying the driving signal to each of the first electrodes 310-1 to 310-8 is finished may be added to be used for calculating the Y axis coordinates.

When the difference values between the sensing signals are calculated, the controller 350 may assign a weighting value to the calculated difference value data and determine a touch input by using the same (S64). When Equation 2 above is taken as an example, it is noted that, in calculating the X axis coordinates, since the sign of the difference value data is changed from (+) to (−) between index 5 and index 6, a lowest weighting value 1 may be assigned to indexes 5 and 6, a weighting value 2 may be assigned to indexes 4 and 7, and a weighting value 3 may be assigned to index 3 which is a farthest. Of course, this is merely an example of the weighting value assigning method and the weighting value may be assigned in a different manner.

The controller 350 may multiply the difference value data by the weighting values assigned to the respective data and obtain the sum of the resultant values (i.e., first sum), and multiply the difference value data by the indexes of the respective data and obtain the sum of the resultant values (i.e., second sum), and add a ratio between the first and second sums to a reference value, thus calculating coordinates. As noted from the embodiment described with reference to the graph of FIG. 5, Table 1 through Table 6, Equation 1, and Equation 2, the influence of noise may be significantly reduced in the manner as described above, thus accurately determining a touch input.

As set forth above, according to embodiments of the invention, a difference value between sensing signals obtained from mutually adjacent sensing electrodes is calculated and a weighting value is assigned to each of difference values based on a sensing channel having a calculated smallest difference value between the sensing signals to determine a touch input, whereby the influence of noise may be significantly reduced, and thus, a touch input may be accurately determined.

While the present invention has been shown and described in connection with the embodiments, it will be apparent to those skilled in the art that modifications and variations may be made without departing from the spirit and scope of the invention as defined by the appended claims.

What is claimed is:

1. A touch input sensing device comprising:
a plurality of sensing electrodes; and
a controller configured to obtain sensing signals generated from the plurality of sensing electrodes through a plurality of sensing channels electrically connected to the plurality of sensing electrodes,
the controller configured to calculate a plurality of difference values between the sensing signals obtained from the plurality of sensing channels connected to mutually adjacent sensing electrodes among the plurality of sensing electrodes to thus determine a touch input,
the controller including a driving circuit unit configured to apply a driving signal to at least some of the plurality of sensing electrodes,
the driving circuit unit configured to apply the driving signal to a plurality of first electrodes which apply the driving signal to the at least some of the plurality of sensing electrodes, and
each one of the plurality of first electrodes crossing each one of a plurality of second electrodes of the plurality of sensing electrodes,
the controller configured to determine weighting values, index the plurality of difference values, and apply the weighting values to difference values of sensing signals of mutually adjacent sensing electrodes
wherein the weighting values corresponding to the plurality of difference values increases with a distance from the index corresponding to a sign change of a difference value.

2. The device of claim 1, wherein the controller includes:
a first circuit unit obtaining the sensing signals; and
a second circuit unit determining the touch input.

3. The device of claim 2, wherein at least one of the first circuit unit and the second circuit unit includes an arithmetic operation circuit calculating the difference value between the sensing signals obtained from the plurality of sensing channels connected to the mutually adjacent sensing electrodes.

4. The device of claim 1, wherein the controller obtains a change in capacitance generated between a sensing electrode of the at least some of the plurality of sensing electrodes to which the driving signal is applied and a sensing electrode adjacent to the sensing electrode of the at least some of the plurality of sensing electrodes to which the driving signal is applied, as the sensing signal.

5. A touch input sensing method comprising:
obtaining sensing signals generated from a plurality of sensing electrodes;
calculating a difference value between the sensing signals obtained from mutually adjacent sensing electrodes among the plurality of sensing electrodes;
determining a touch input based on the difference value between the sensing signals;
applying a driving signal to at least some of the plurality of sensing electrodes,
the applied driving signal being applied to a plurality of first electrodes which apply the driving signal to the at least some of the plurality of sensing electrodes, and
each one of the plurality of first electrodes crossing each one of a plurality of second electrodes of the plurality of sensing electrodes; and
determining weighting values and applying the weighting values to difference values, of sensing signals of mutually adjacent sensing electrodes,
wherein the weighting values corresponding to the plurality of difference values increase with a distance from an index corresponding to a sign change of a difference value.

6. The method of claim 5, wherein the obtaining of the sensing signals comprises obtaining a change in capacitance, generated by the plurality of sensing electrodes due to the touch input, as a sensing signal of the sensing signals.

7. The method of claim 5, wherein the obtaining of the sensing signals comprises obtaining a change in capacitance generated between a sensing electrode of the plurality of sensing electrodes to which the driving signal is applied and a sensing electrode adjacent to the sensing electrode of the plurality of sensing electrodes to which the driving signal is applied, as a sensing signal of the sensing signals.

8. A touch input sensing device comprising:
sensing electrodes configured to generate sensing signals; and
a controller configured to:
receive sensing signals through adjacent sensing channels,
determine signal values for the sensing channels, calculate difference values between the sensing channels, index the difference values into corresponding indexes, determine a sign change index as the index closest to a change in sign of one of the difference values, determine weighting values for the difference values according to the indexes, wherein the weighting values increase with distance from the sign change index, and apply the weighting values to the corresponding difference values.

9. The device of claim 8, wherein the controller is configured to determine that the weighting value applied to the difference value corresponding to the sign change index is a smaller weighting value than the weighting value to a difference value corresponding to a next or previous index.

10. A touch input sensing method comprising:

generating sensing signals through sensing electrodes;

receiving sensing signals through adjacent sensing channels;

determining signal values for sensing channels;

calculating difference values between the sensing channels;

indexing the difference values into corresponding indexes;

determining a sign change index as the index closest to a change in sign of one of the difference values;

determining weighting values for the difference values according to the indexes, wherein the weighting values increase with distance from the sign change index; and applying the weighting values to the corresponding difference values.

11. The method of claim 10, wherein the determining of the weighting value applied to the difference value corresponding to the sign change index is a smaller weighting value than the weighting value applied to a difference value corresponding to a next or previous index.

\* \* \* \* \*